April 12, 1960  W. A. RAY  2,932,455
FUEL CONTROL SYSTEM
Filed Aug. 20, 1956  2 Sheets-Sheet 1
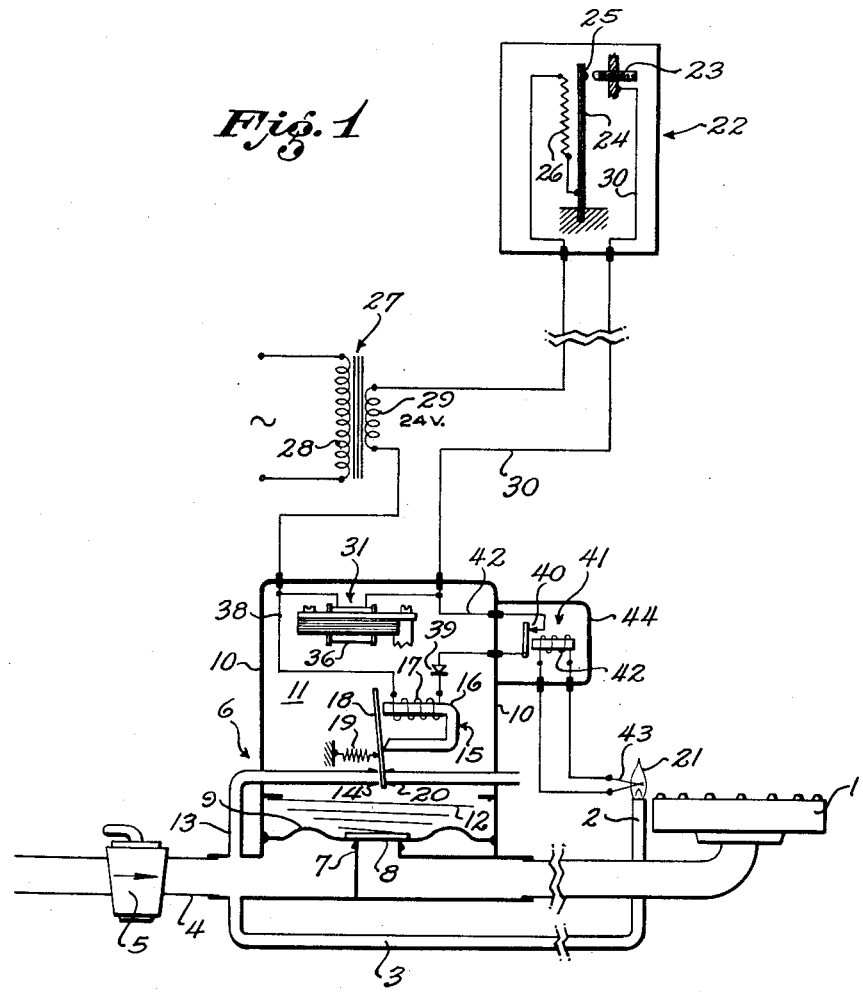
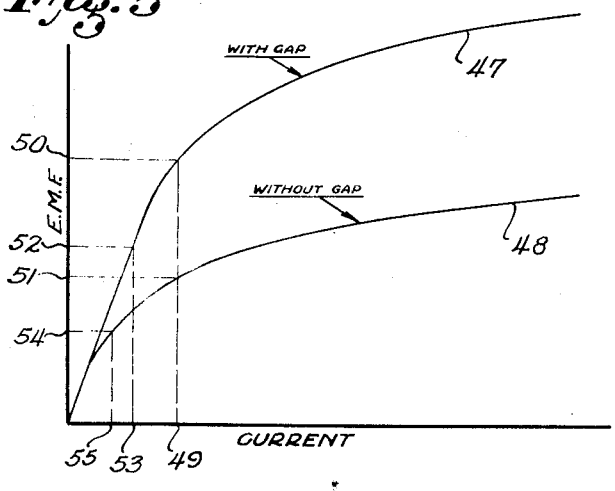
INVENTOR,
WILLIAM A. RAY
BY
Flam and Flam
ATTORNEYS.

April 12, 1960 W. A. RAY 2,932,455
FUEL CONTROL SYSTEM
Filed Aug. 20, 1956 2 Sheets-Sheet 2
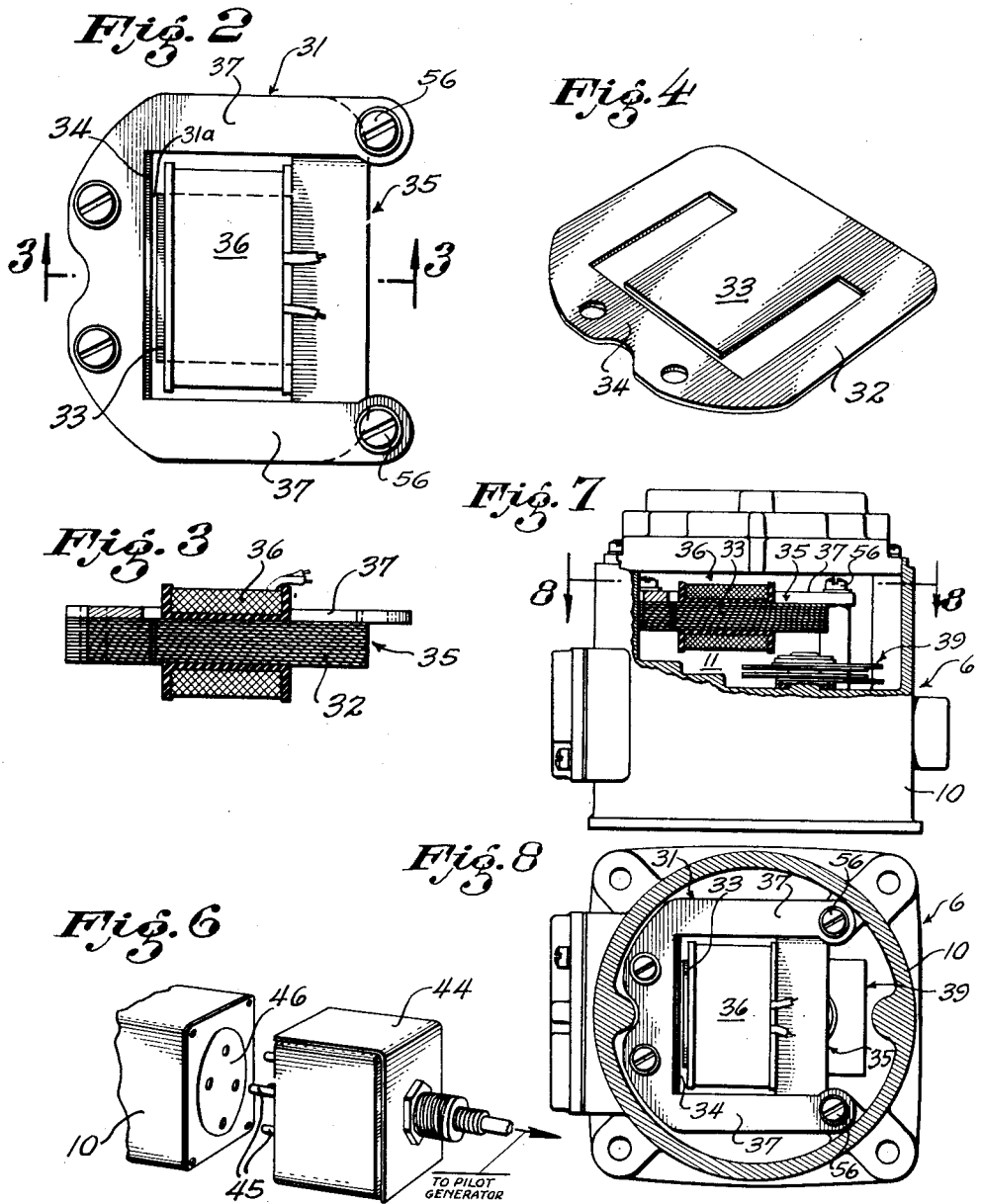
INVENTOR,
WILLIAM A. RAY
BY Flam and Flam
ATTORNEYS.

United States Patent Office 2,932,455
Patented Apr. 12, 1960

2,932,455

FUEL CONTROL SYSTEM

William A. Ray, North Hollywood, Calif., assignor to General Controls Co., a corporation of California Application August 20, 1956, Serial No. 605,170

4 Claims. (Cl. 236—68)

This invention relates to a system for controlling the supply of fuel to a burner, such as a gas burner.

In such systems, it is common to provide a condition-responsive device, such as a thermostat switch, for causing a valve to open when heat is demanded, and to close when the temperature attains the desired value. It is also common to provide an electrical heater operating as a heat anticipator, for affecting the thermostat when the thermostat contacts are closed. The operation of such devices is well-known; they effect opening of the contacts in anticipation of the attainment of the desired temperature.

The valve structure, operating in response to the closing and opening of the thermostat contacts, is sometimes arranged to be operated by the fluid fuel pressure. For this purpose, the valve has a movable diaphragm, carrying the valve closure; and the diaphragm is urged to valve opening position by the inlet pressure. To close the valve, fluid pressure is exerted on the other side of the diaphragm, to overcome the opening force on the inlet side of the diaphragm. A jet, controlled by the armature of a small electromagnet, is utilized to lead gas or other fluid fuels to the said other side of the diaphragm, for opening the valve.

Obviously, such an arrangement for the control of the jet requires only a minor expenditure of electrical energy. Often the energy generated by a pilot flame generator is sufficient for operating the electromagnet. Such a pilot flame-responsive device is used at times to ensure that the main burner cannot be supplied with fuel unless the pilot flame is in existence.

It has also been common to utilize a source of external power for the combined load of the heat anticipator and the electromagnet. The heat anticipator, however, requires a relatively large current flow, e.g. 450 milliamperes, and the electromagnet requires a relatively small current flow, e.g. 25 milliamperes.

It is one of the objects of this invention to provide proper operative current for each of these two devices without entailing intolerable energy losses.

It is another object of this invention to provide a control system of this character that can furnish the desired operating current by the aid of simple and inexpensive apparatus.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a diagrammatic representation of a system incorporating the invention;

Fig. 2 is a plan view of an impedance device utilized in connection with the invention;

Fig. 3 is a sectional view taken along a plane corresponding to line 3—3 of Fig. 2;

Fig. 4 is a pictorial view of a lamination for the impedance device illustrated in Fig. 2;

Fig. 5 is a graph for aid in explaining the mode of operation of the impedance device;

Fig. 6 is a pictorial view illustrating a plug-in type of relay utilized in the system shown in Fig. 1;

Fig. 7 is an elevation, partly in section, of a valve structure in which the invention is embodied; and Fig. 8 is a sectional view taken along a plane corresponding to line 8—8 of Fig. 7.

The system includes, in general, a main burner 1 and a pilot burner 2. The pilot burner 2 is adapted to be supplied through a conduit 3 leading to a main conduit 4 manually controlled as, for example, by a plug valve 5. The main burner 1 is also controlled by the main shut-off plug valve 5. There is an additional control, as by a valve structure 6 (see also Figs. 7 and 8), which responds to demands for heat. This valve structure 6 includes a valve seat 7 adapted to be closed by a yielding valve closure 8 carried by a flexible diaphragm 9. This diaphragm 9 serves to define, in conjunction with a casing 10, an enclosed chamber 11. A compression spring 12 supported by the casing 10 serves to urge the closure 8 to closed position. The inlet pressure of the gas, however, urges the diaphragm 9 upwardly toward open position.

In addition to the force of the spring 12, the pressure of the gas fuel may be used. For this purpose, gas fuel may be passed into the chamber 11 as by the aid of a conduit 13. This conduit ends in a jet 14, shown as open. In this position, fluid under pressure is passed into the chamber 11, serving to urge the diaphragm 9 downwardly to seat the closure 8.

An electromagnet structure 15 is utilized to shut off the supply of fluid into the chamber 11. This electromagnet structure includes a U-shaped core 16 and a magnetizing coil 17. Pivoted by the aid of one of the legs of the core 16 is an armature 18 urged to the position shown by the aid of a compression spring 19.

When energized, the electromagnet 15 moves the armature 18 in a clockwise direction to close the jet 14 and stop the flow of gas to the chamber 11. At the same time, it opens an opposite jet 20 which vents the gas in chamber 11 to the atmosphere adjacent the pilot flame 21.

Accordingly, when the electromagnet 15 is energized, gas fuel pressure underneath the diaphragm 9 is sufficient to overcome the force of spring 12 and the valve is opened.

Control of the electromagnet 15 is effected by the aid of a thermostat switch 22. This thermostat switch may include an adjustable contact member 23 and a bimetal arm 24 which flexes toward the left upon an increase in temperature. The bimetal arm carries a movable contact member 25 adapted to engage the contact member 23. A heat anticipator 26 is provided for the thermostat 22 so as to cause opening of the contact slightly before the desired temperature is attained. This anticipator is in the form of a heating resistance in good heat-conducting relationship to the bimetal arm 24.

In order to supply energy to the system, use is made of a transformer 27 having a primary winding 28 and a secondary winding 29. The primary winding 28 may be connected to a commercial source of alternating current. The secondary winding 29 is arranged to provide an electromotive force of about twenty-four volts so as to provide a relatively low voltage for the operation of the control elements. The anticipator 26 is a predominantly resistive load for the transformer 27.

When the thermostat contact members 23 and 25 engage, a circuit is completed as follows: from the upper terminal of secondary winding 29, heat anticipator 26, arm 24, contact members 25 and 23, a conductor 30, an impedance device 31, to the lower terminal of the secondary winding 29.

The impedance device 31 may be supported within the casing 10 (see Figs. 7 and 8). This may be accomplished by the aid of machine screws 56 passing through the lamination stack 35 and engaging bosses in casing 10. The construction of the device 31 is shown to best advantage in Figs. 2, 3 and 4. It includes the stack of laminations 35. Each lamination 32 is shown as being of the shell type, there being a central leg 33. The end of the central leg 33 provides a small air gap 31a between it and the yoke 34. The stack 35, as shown in Figs. 2, 3, 7 and 8 accommodates a coil 36 upon the central leg 33. A supporting bracket 37 is attached to one side of the stack 35. By the aid of this bracket, the device can be supported appropriately within the casing 10.

The electromagnet coil 17 is adapted to be connected in parallel with the device 31 and across the terminals thereof. In the present instance, this can be effected only while the pilot flame 21 is in existence. How this is effected will now be described.

The circuit paralleling the device 31 includes a conductor 38, coil 17, a rectifier 39 supported appropriately in casing 10, front contact 40 of a relay 41 and conductor 42 to the other terminal of the device 31. This rectifier may be of the dry disk type.

In order that this branch circuit be energized, a relay coil 42 must be energized. This coil is directly supplied with current from a thermoelectric generator 43 adapted to be influenced by the pilot flame 21. If desired, the relay 41 may be omitted and the parallel circuit may be such as to exclude the front contacts 40 of this relay.

To facilitate conversion of the system to eliminate the pilot flame safety feature illustrated in Fig. 1, the relay 41 may be housed in a casing 44, such as that illustrated in Fig. 6. This casing is provided with a plurality of prongs 45 adapted to engage a receptacle 46. When the casing 44 is separated from the casing 10 in the position shown in Fig. 6, connection is completed directly from the rectifier 39 to the right-hand terminal of the device 31.

Since the heat anticipator resistance 26 demands a relatively high current, such as 450 milliamperes, it is desirous to reduce the energy consumption in the device 31 and the coil 17. This coil 17 is usually designed to operate on much less current, such as 25 milliamperes. In order to conserve the energy available for the anticipator 26, the impedance device 31 forms a predominantly inductive load. This is effected by proper design of this device, as heretofore described.

Since the electromotive force leads the current in phase through the device 31, it does not very materially reduce the electromotive force available across the terminals of the anticipator 26. Due to this out-of-phase relationship therefore, the energy consumption in the device 31 is quite inappreciable, although the electromotive force available across its terminals is sufficient to provide the weak current required for the coil 17.

The provision of the air gap also serves to minimize the effect of line voltages deviating from normal. It is not too uncommon for a 110-volt main to rise and fall by several volts, depending upon the load conditions upon the commercial system.

The graphs of Fig. 5 illustrate the effect of the air gap. The ordinates represent the electromotive force applied to the device 31 and the abscissas represent current flow. The curve 47 represents the relationship of the electromotive force and current with the air gap in the laminations; and curve 48 represents the relationship between the electromotive force and current without the gap. Since with the gap the impedance is increased, the electromotive force must be higher to obtain the same current flow.

Thus, for example, if the value of the desired current through coil 36 and heater 26 is represented by the abscissa 49, the electromotive force with the gap is represented by the ordinate 50. For the same current flow without the gap, the electromotive force is represented by the ordinate 51. Now should the electromotive force across the impedance with an air gap be reduced from the value represented by ordinate 50 to the value represented by the ordinate 52, there is a reduction in current represented by the difference between the abscissas 49 and 53. For the same ratio of reduction of electromotive force from a value 51 to a value 54 when the impedance is used without the air gap, the current is reduced to a value corresponding to abscissa 55. It is thus seen that regulation is considerably improved when an impedance with an air gap is used.

The inventor claims:

1. In a gaseous fuel control system: a thermostat switch having an anticipator that is predominantly resistive, for heating the thermostat when the switch is closed; an impedance that is predominantly reactive in series with the anticipator; and an electromagnetic relay device connected across the impedance for controlling the flow of fuel; said impedance utilizing but a small portion of the effective electromotive force across both the anticipator and the relay device; and the relay device constituting a minor load on the system as compared with the anticipator.

2. In a gaseous fuel control system: a thermostat switch having an anticipator that is predominantly resistive, for heating the thermostat when the switch is closed; a fuel valve having a closure urged toward open position by the pressure of the fuel; an impedance that is predominantly reactive in series with the anticipator; means conducting fuel to a chamber for urging the closure to closed position; and an electromagnet having an armature interrupting flow of fuel into the chamber when energized, said electromagnet being connected across the impedance.

3. In a gaseous fuel control system: a thermostat switch having an anticipator that is predominantly resistive, for heating the thermostat when the switch is closed; a fuel valve having a closure urged toward open position by the pressure of the fuel; an impedance that is predominantly reactive in series with the anticipator; means conducting fuel to a chamber for urging the closure to closed position; and an electromagnet having an armature interrupting flow of fuel into the chamber when energized, said electromagnet being connected across the impedance; said impedance utilizing but a small portion of the effective electromotive force across both the anticipator and the electromagnet.

4. In a gaseous fuel control system: a thermostat switch having an electrical heater forming a heat anticipator, and predominantly resistive in character; said switch serving to energize said anticipator when the switch demands more heat; an impedance producing device that is predominantly reactive in series with the anticipator; said impedance producing device including a magnetic core with an air gap, and a coil mounted on the core; the anticipator utilizing the greater portion of the total electromotive force across the series circuit comprising the anticipator and the impedance producing device; a fuel valve having a closure urged toward open position by the pressure of the fuel; said fuel valve providing a chamber into which fuel under pressure can be passed to maintain the valve in closed position; and an electromagnet having an armature in the chamber for interrupting the flow of fuel into the chamber to cause the valve to open, when the electromagnet is energized; said electromagnet being connected across the impedance producing device.

References Cited in the file of this patent

UNITED STATES PATENTS

| | | |
|---|---|---|
| Re. 20,317 | Suits | Mar. 30, 1937 |
| 671,730 | Mershon | Apr. 9, 1901 |
| 1,353,711 | Bergman | Sept. 21, 1920 |
| 1,885,053 | Slough | Oct. 25, 1932 |
| 2,006,658 | Smulski | July 2, 1935 |
| 2,061,536 | Dillman | Nov. 17, 1936 |
| 2,201,329 | Wallis et al. | May 21, 1940 |
| 2,286,296 | McGrath | June 16, 1942 |
| 2,294,694 | Ray | Sept. 1, 1942 |
| 2,333,995 | Gaynor | Nov. 9, 1943 |
| 2,410,183 | Ray | Oct. 29, 1946 |
| 2,628,676 | Shottenfeld | Feb. 17, 1953 |
| 2,828,463 | Baker | Mar. 25, 1958 |

FOREIGN PATENTS

| | | |
|---|---|---|
| 1,044,458 | France | June 17, 1953 |